United States Patent
Xie et al.

(10) Patent No.: US 10,387,357 B2
(45) Date of Patent: Aug. 20, 2019

(54) FIELD-PROGRAMMABLE GATE ARRAY CONFIGURATION CIRCUIT, RADIO-FREQUENCY UNIT AND MAGNETIC RESONANCE SYSTEM

(71) Applicant: Siemens Healthcare GmbH, Erlangen (DE)

(72) Inventors: Shu Qun Xie, Shenzhen (CN); Hai Bo Yu, Shenzhen (CN); Wen Bin Zhu, Shenzhen (CN)

(73) Assignee: Siemens Healthcare GmbH, Erlangen (DE)

( * ) Notice: Subject to any disclaimer, the term of this patent is extended or adjusted under 35 U.S.C. 154(b) by 195 days.

(21) Appl. No.: 15/142,319

(22) Filed: Apr. 29, 2016

(65) Prior Publication Data

US 2016/0321088 A1    Nov. 3, 2016

(30) Foreign Application Priority Data

Apr. 30, 2015 (CN) ...................... 2015 2 0276037 U

(51) Int. Cl.
   *G06F 13/12*   (2006.01)
   *G06F 13/42*   (2006.01)
   *G06F 15/78*   (2006.01)
   *G06F 9/44*    (2018.01)

(52) U.S. Cl.
   CPC ...... *G06F 13/4265* (2013.01); *G06F 15/7871* (2013.01); *G06F 9/44* (2013.01)

(58) Field of Classification Search
   CPC ...... G06F 3/067; G06F 3/0604; G06F 3/0482; G06F 3/061; H04L 67/10; H03K 19/177

USPC ........................................................ 710/104
See application file for complete search history.

(56) References Cited

U.S. PATENT DOCUMENTS

| | | | | |
|---|---|---|---|---|
| 6,034,542 | A * | 3/2000 | Ridgeway | H03K 19/177 326/38 |
| 6,191,614 | B1 * | 2/2001 | Schultz | H03M 13/09 326/38 |
| 6,631,520 | B1 * | 10/2003 | Theron | G06F 8/65 712/E9.007 |
| 2002/0008540 | A1 * | 1/2002 | Britton | G06F 1/10 326/40 |
| 2006/0279984 | A1 * | 12/2006 | Seta | H03K 19/1776 365/174 |

(Continued)

*Primary Examiner* — Titus Wong
(74) *Attorney, Agent, or Firm* — Schiff Hardin LLP

(57) ABSTRACT

In a field-programmable gate array (FPGA) configuration circuit, and a radio-frequency unit and a magnetic resonance system having a configuration circuit, the configuration circuit has at least two FPGA modules, each FPGA module being individually connected to a bus; at least two storage devices, each storage device storing a configuration file; one of the at least two FPGA modules being connected to the at least two storage devices separately, and an input end, connected separately to the at least two storage devices. A selection signal is provided for selecting one of the at least two storage devices. The FPGA module connected to the at least two storage devices reads a configuration file stored in a storage device selected on the basis of the selection signal, and sends, via the bus, the configuration file that has been read to the FPGA module other than the FPGA module connected to the at least two storage devices.

5 Claims, 4 Drawing Sheets

(56) References Cited

U.S. PATENT DOCUMENTS

| | | | |
|---|---|---|---|
| 2007/0260869 A1* | 11/2007 | Dade | G06F 9/4401 713/2 |
| 2010/0115252 A1* | 5/2010 | Campbell | G06F 11/1415 713/1 |
| 2013/0232328 A1* | 9/2013 | Johnson | G06F 8/60 713/2 |
| 2013/0282945 A1* | 10/2013 | Kelly | G06F 13/40 710/305 |

* cited by examiner

FIELD-PROGRAMMABLE GATE ARRAY CONFIGURATION CIRCUIT, RADIO-FREQUENCY UNIT AND MAGNETIC RESONANCE SYSTEM

BACKGROUND OF THE INVENTION

Field of the Invention

The present invention concerns the technical field of electronic elements, in particular to a field-programmable gate array (FPGA) configuration circuit, a radio-frequency unit and a magnetic resonance system.

Description of the Prior Art

A field-programmable gate array (FPGA) is a programmable device. Unlike conventional logic circuits and gate arrays, an FGPA utilizes small lookup tables to realize combinational logic. Each lookup table is connected to an input end of a D flip-flop. The D flip-flop drives another logic circuit or drives an I/O, thereby forming a basic logic unit module capable of realizing a combinational logic function as well as a sequential logic function.

Master-slave mode FPGA architectures are quite common at present. In a master-slave mode FPGA architecture, a master FPGA module is responsible for reading a configuration file from a storage device, and based on the configuration file, self-starting and starting a slave FPGA module.

When a master-slave mode FPGA architecture has no external clock signal input, the master FPGA module reads a configuration file in the form of loadware from a storage device storing a configuration file in the form of firmware and a configuration file in the form of loadware, and tries to use the configuration file in the form of loadware which has been read for self-starting. Once the master FPGA module has successfully self-started, the configuration file in the form of loadware which has been read is written into the slave FPGA module, so as to start the slave FPGA module. If the master FPGA module cannot use the configuration file in the form of loadware to successfully self-start, then it reads a configuration file in the form of firmware from the storage device, and uses the configuration file in the form of firmware which has been read for self-starting. Once the master FPGA module has successfully self-started, the configuration file in the form of firmware which has been read is written into the slave FPGA module, so as to start the slave FPGA module.

However, in such an embodiment, the master FPGA module in the FPGA architecture can only first of all read a configuration file in the form of loadware, and only reads a configuration file in the form of firmware if self-starting has failed, thus there is just one manner of configuration.

Moreover, if a fault occurs in the storage device storing a configuration file in the form of firmware and a configuration file in the form of loadware in a centralized manner, the master FPGA module will be unable to read any configuration file, with the result that the FPGA architecture will be unable to accomplish configuration.

SUMMARY OF THE INVENTION

The aspects of the present invention concern an FPGA configuration circuit, a radio-frequency unit and a magnetic resonance system.

According to one aspect of the invention, an FPGA configuration circuit has at least two FPGA modules, each FPGA module being individually connected to a bus, at least two storage devices, each storage device storing a configuration file, one of the at least two FPGA modules being connected to the at least two storage devices separately, and an input end, connected separately to the at least two storage devices, and a selection signal provided for selecting one of the at least two storage devices. The FPGA module connected to the at least two storage devices reads a configuration file stored in a storage device selected on the basis of the selection signal, and sends, via the bus, the configuration file that has been read to the other FPGA module (the FPGA module other than the FPGA module that is connected to the at least two storage devices).

In an embodiment, the at least two storage devices includes a first storage device and a second storage device, wherein the configuration file in the first storage device is stored in a form of loadware, and the configuration file in the second storage device is stored in a form of firmware.

In another embodiment, the at least two storage devices includes a first storage device and a second storage device, wherein the configuration file in the first storage device is stored in a form of a first version of loadware, and the configuration file in the second storage device is stored in a form of a second version of loadware.

In another embodiment, the at least two storage devices include a first storage device and a second storage device, wherein the configuration file in the first storage device is stored in a form of a first version of firmware, and the configuration file in the second storage device is stored in a form of a second version of firmware.

In another embodiment, the at least two storage devices include a first storage device, a second storage device and a third storage device, wherein one of the following is implemented.

A first alternative is that the configuration file in the first storage device is stored in a form of a first version of firmware, the configuration file in the second storage device is stored in a form of a second version of firmware, and the configuration file in the third storage device is stored in a form of loadware.

A second alternative is that the configuration file in the first storage device is stored in a form of a first version of loadware, the configuration file in the second storage device is stored in a form of a second version of loadware, and the configuration file in the third storage device is stored in a form of firmware.

A third alternative is that the configuration file in the first storage device is stored in a form of a first version of loadware, the configuration file in the second storage device is stored in a form of a second version of loadware, and the configuration file in the third storage device is stored in a form of a third version of loadware.

A fourth alternative is that the configuration file in the first storage device is stored in a form of a first version of firmware, the configuration file in the second storage device is stored in a form of a second version of firmware, and the configuration file in the third storage device is stored in a form of a third version of firmware.

Preferably, the bus is a serial peripheral interface (SPI) bus or an I2C protocol bus.

Preferably, the storage device is a NOR flash memory or a NAND flash memory.

Preferably, the input end is a chip select signal input end or an enable signal input end.

A radio-frequency unit according to another aspect of the invention has any of the FPGA configuration circuits described above.

A magnetic resonance system according to another aspect of the invention has any of the FPGA configuration circuits described above.

It can be seen from the above technical solution that in the embodiments of the present invention, there are at least two FPGA modules, each FPGA module being connected individually to a bus at least two storage devices, each storage device storing a configuration file; one of the at least two FPGA modules being connected to the at least two storage devices separately and an input end, connected separately to the at least two storage devices. A selection signal is provided for selecting one of the at least two storage devices. The FPGA module connected to the at least two storage devices is used for reading a configuration file stored in a storage device selected on the basis of the selection signal, and sending via the bus the configuration file which has been read to the FPGA module other than the FPGA module connected to the at least two storage devices. The master FPGA module can read a corresponding configuration file according to the selection signal provided by the input end, thus the manner in which the FPGA architecture is configured is more flexible.

Moreover, configuration files are stored in different storage devices, and back up each other. If a fault occurs in a storage device, the FPGA architecture can still obtain a configuration file from a storage device acting as backup and accomplish configuration, thereby improving system security.

DESCRIPTION OF THE PREFERRED EMBODIMENTS

Figure 1:
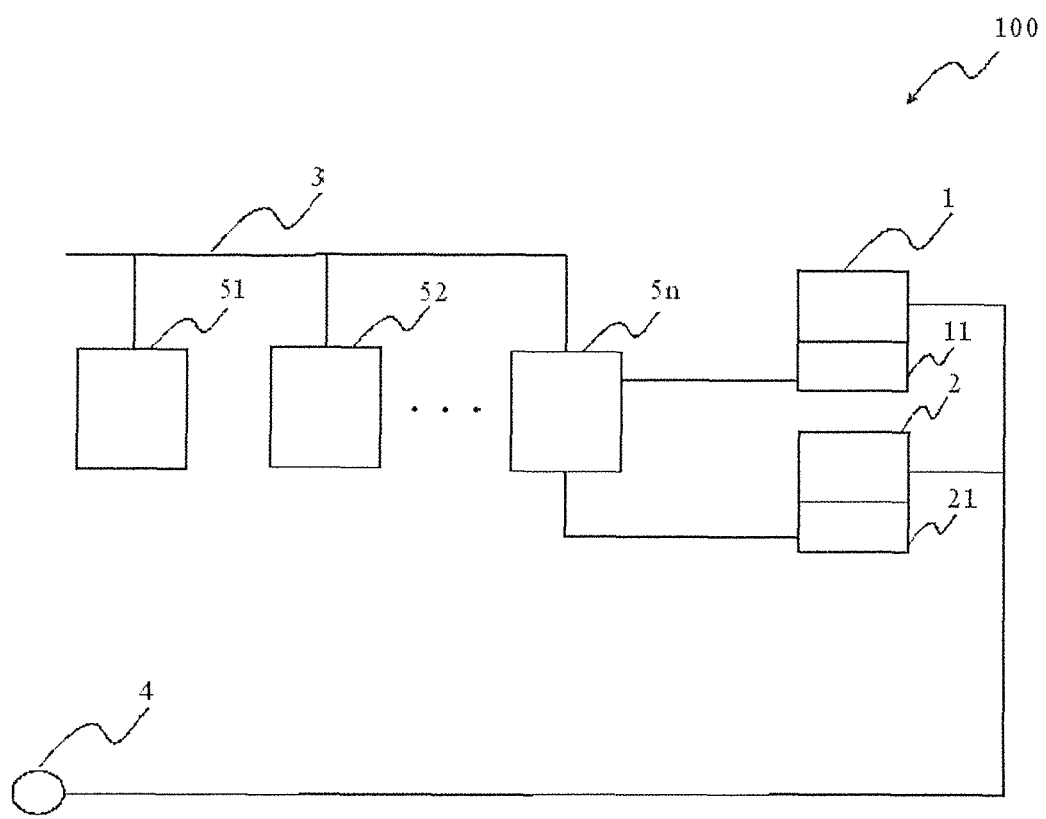
FIG. 1 is a structural diagram of an FPGA configuration circuit according to a first embodiment of the present invention.

FIG. 1 shows a configuration circuit 100, FPGA modules 51, 52 . . . 5n, a; first storage device 1, a second storage device 2, bus 3, an input end 4, a configuration file 11 in the form of firmware, and a configuration file 21 in form of loadware.

Figure 2:
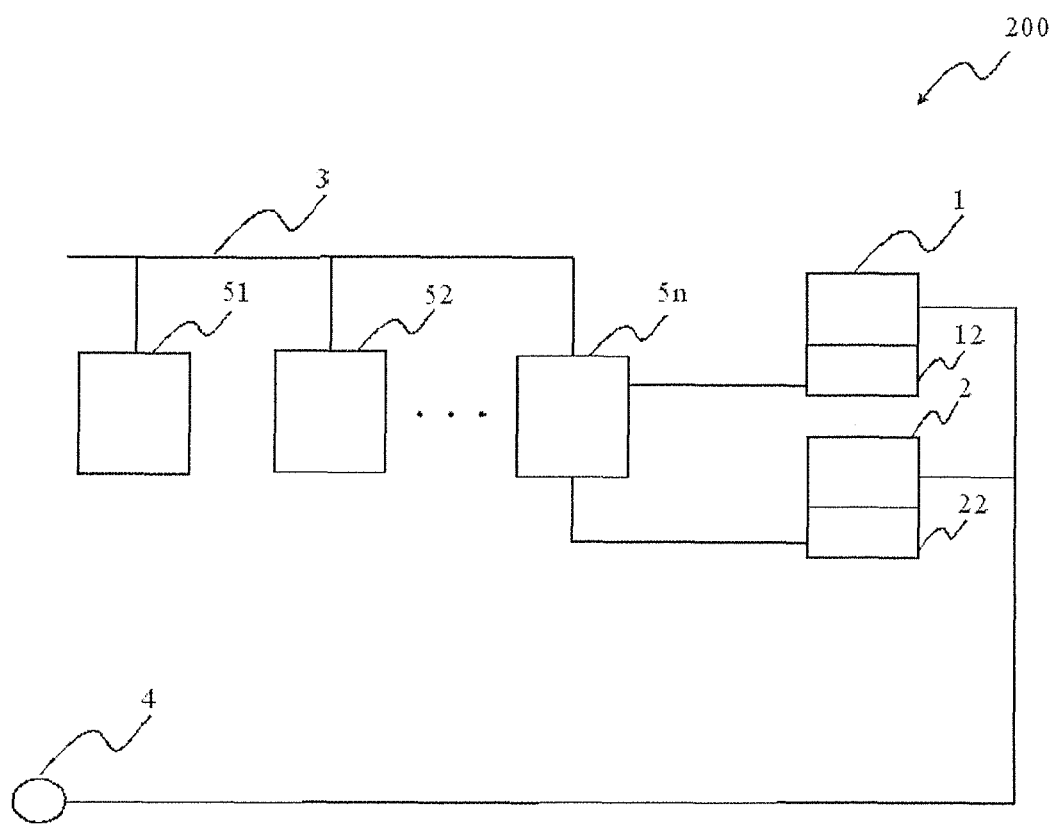
FIG. 2 is a structural diagram of an FPGA configuration circuit according to a second embodiment of the present invention.

FIG. 2 shows a configuration circuit 200, FPGA modules 51, 52 . . . 5n, a first storage device 1, a second storage device 2, a bus 3, an input end 4, a configuration file 12 with version number 1 in form of firmware, and a configuration file 22 with version number 2 in form of firmware.

Figure 3:
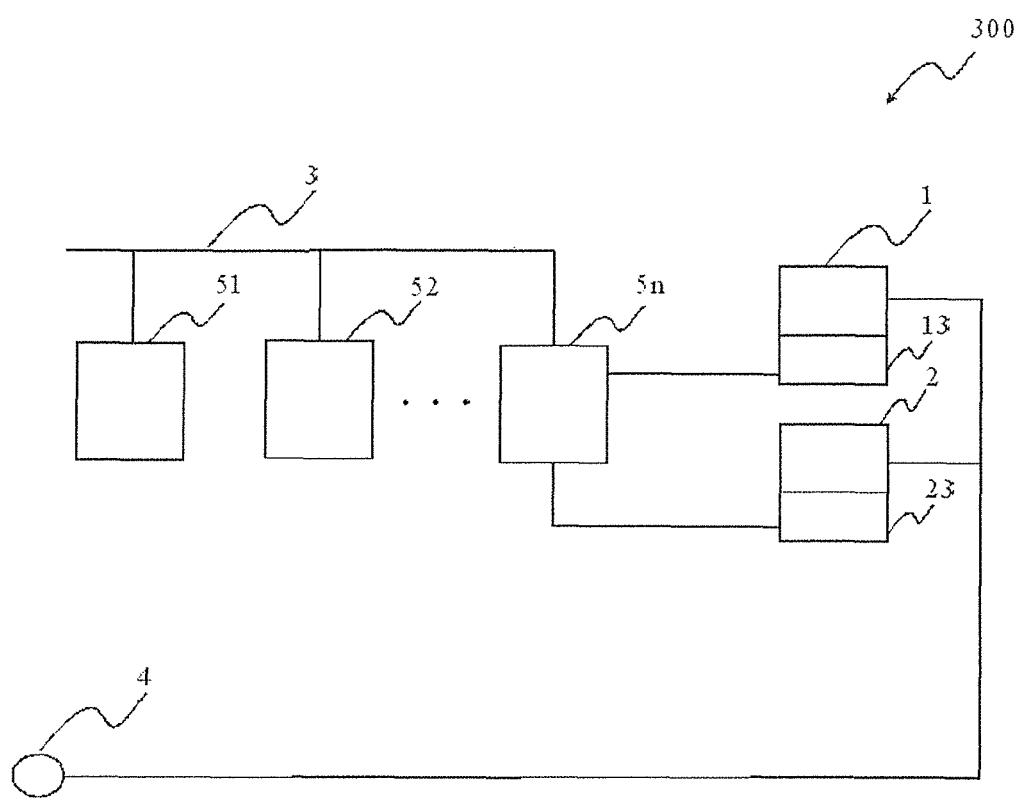
FIG. 3 is a structural diagram of an FPGA configuration circuit according to a third embodiment of the present invention.

FIG. 3 shows a configuration circuit 300, FPGA modules 51, 52 . . . 5n, a first storage device 1, a second storage device 2, a bus 3, an input end 4, a configuration file 13 with version number 1 in form of loadware, and a configuration file 23 with version number 2 in form of loadware.

Figure 4:
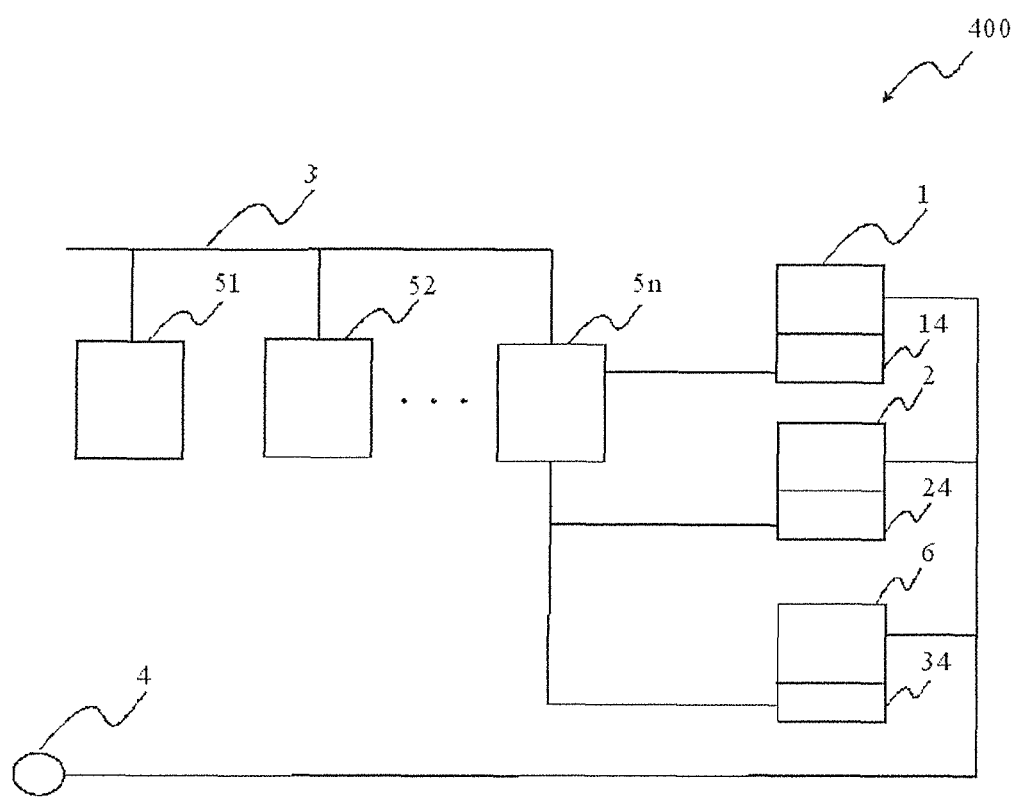
FIG. 4 is a structural diagram of an FPGA configuration circuit according to a fourth embodiment of the present invention.

FIG. 4 shows a configuration circuit 400, FPGA modules 51, 52 . . . 5n, a first storage device 1, a second storage device 2, a third storage device 6, a bus 3, an input end 4, a configuration file 14 in form of firmware, a configuration file 24 with version number 1 in form of loadware, and a configuration file 34 with version number 2 in form of loadware.

As noted above, FIG. 1 is a structural diagram of an FPGA configuration circuit according to a first embodiment of the present invention.

As FIG. 1 shows, the configuration circuit 100 has:
- n (n being a natural number of at least 2) FPGA modules 51, 52 . . . 5n which are individually connected to a bus 3;
- a first storage device 1, storing a configuration file 11 in the form of firmware;
- a second storage device 2, storing a configuration file 21 in the form of loadware;
- one of the n FPGA modules (e.g. FPGA module 5n) being connected to the first storage device 1 and the second storage device 2 separately, the FPGA module 5n being a master FPGA module, while the other FPGA modules are slave FPGA modules;
- an input end 4, connected to the first storage device 1 and the second storage device 2 separately, and providing a selection signal for selecting one of the first storage device 1 and the second storage device 2;
- wherein the FPGA module 5n connected to the first storage device 1 and the second storage device 2 reads a configuration file stored in a storage device selected on the basis of the selection signal, and sends the configuration file which has been read to the FPGA modules other than the FPGA module 5n via the bus 3.

When the selection signal provided by the input end 4 selects the first storage device 1, the FPGA module 5n connected to the first storage device 1 and the second storage device 2 reads the configuration file 11 in the form of firmware stored in the first storage device 1, and starts itself on the basis of the configuration file 11 in the form of firmware. Once the FPGA module 5n has successfully started, it sends the configuration file 11 in the form of firmware which has been read from the first storage device 1 to the FPGA modules other than the FPGA module 5n via the bus 3. Having received the configuration file 11 in the form of firmware, the FPGA modules other than the FPGA module 5n are individually started on the basis of the configuration file 11 in the form of firmware.

When the selection signal provided by the input end 4 selects the second storage device 2, the FPGA module 5n connected to the first storage device 1 and the second storage device 2 reads the configuration file 21 in the form of loadware stored in the second storage device 2, and starts itself on the basis of the configuration file 21 in the form of loadware. Once the FPGA module 5n has successfully started, it sends the configuration file in the form of loadware which has been read to the FPGA modules other than the FPGA module 5n via the bus 3. Having received the configuration file 21 in the form of loadware, the FPGA modules other than the FPGA module 5n are individually started on the basis of the configuration file 21 in the form of loadware.

In the FPGA architecture shown in FIG. 1, the master FPGA module 5n can read a configuration file in the form of loadware or in the form of firmware according to the selection signal provided by the input end 4, thus the manner in which the FPGA architecture is configured is more flexible.

Furthermore, in the FPGA architecture shown in FIG. 1, the configuration file 11 in the form of firmware and the configuration file 21 in the form of loadware are stored in different storage devices, and back up each other. If a fault occurs in a storage device, the FPGA architecture can still accomplish configuration, and system security is improved. For example, if a fault occurs in the first storage device 1, the input end 4 can provide a selection signal to select the second storage device 2, and the FPGA module 5n can read the configuration file 21 in the form of loadware from the second storage device 2; if a fault occurs in the second storage device 2, the input end 4 can provide a selection signal to select the first storage device 1, and the FPGA module 5n can read the configuration file 11 in the form of firmware from the first storage device 1.

The input end 4 may be implemented as a chip select (CS) signal input end, in which case the selection signal provided by the input end 4 is a chip select signal. A relationship whereby the first storage device 1 and the second storage device 2 correspond to HIGH/LOW levels of the chip select signal is set in advance. For example: when the chip select signal is HIGH, the first storage device 1 is selected; when the chip select signal is LOW, the second storage device 2 is selected.

The input end 4 may also be implemented as two enable (CE) signal input ends, with each CE signal input end being connected to a corresponding storage device. For example, a first CE signal input end is connected to the first storage device 1; a second CE signal input end is connected to the second storage device 2. When the first CE signal input end provides a HIGH level, the first storage device 1 is selected; when the second CE signal input end provides a HIGH level, the second storage device 2 is selected, wherein the first CE signal input end and the second CE signal input end cannot be HIGH at the same time.

In an embodiment, the bus 3 may be implemented as a serial bus such as a serial peripheral interface (SPI) bus or an I2C protocol bus.

Moreover, the first storage device 1 and the second storage device 2 may be implemented as flash memory, preferably NOR flash memory or NAND flash memory.

As noted above, FIG. 2 is a structural diagram of an FPGA configuration circuit according to a second embodiment of the present invention.

As FIG. 2 shows, the configuration circuit 200 has:
n (n being a natural number of at least 2) FPGA modules 51, 52 . . . 5n which are individually connected to a bus 3;
a first storage device 1, storing a configuration file 12 in the form of firmware, a version number of the configuration file being 1;
a second storage device 2, storing a configuration file 22 in the form of firmware, a version number of the configuration file being 2;
one of the n FPGA modules (e.g. FPGA module 5n) being connected to the first storage device 1 and the second storage device 2 separately, the FPGA module 5n being a master FPGA module, while the other FPGA modules are slave FPGA modules;
an input end 4, connected to the first storage device 1 and the second storage device 2 separately, and providing a selection signal for selecting one of the first storage device 1 and the second storage device 2;
wherein the FPGA module 5n connected to the first storage device 1 and the second storage device 2 reads a configuration file stored in a storage device selected on the basis of the selection signal, and sends the configuration file which has been read to the FPGA modules other than the FPGA module 5n via the bus 3.

When the selection signal provided by the input end 4 selects the first storage device 1, the FPGA module 5n connected to the first storage device 1 and the second storage device 2 reads the configuration file 12 with version number 1 in the form of firmware stored in the first storage device 1, and starts itself on the basis of the configuration file 12. Once the FPGA module 5n has successfully started, it sends the configuration file 12 with version number 1 in the form of firmware which has been read to the FPGA modules other than the FPGA module 5n via the bus 3. Having received the configuration file 12 with version number 1 in the form of firmware, the FPGA modules other than the FPGA module 5n are individually started on the basis of the configuration file 12.

When the selection signal provided by the input end 4 selects the second storage device 2, the FPGA module 5n connected to the first storage device 1 and the second storage device 2 reads the configuration file 22 with version number 2 in the form of firmware stored in the second storage device 2, and starts itself on the basis of the configuration file 22. Once the FPGA module 5n has successfully started, it sends the configuration file 22 with version number 2 in the form of firmware to the FPGA modules other than the FPGA module 5n via the bus 3. Having received the configuration file 22, the FPGA modules other than the FPGA module 5n are individually started on the basis of the configuration file 22.

In the FPGA architecture shown in FIG. 2, the master FPGA module can read configuration files which are both in the form of firmware but which are different versions according to the selection signal provided by the input end, thus the manner in which the FPGA architecture is configured is more flexible.

Furthermore, in the FPGA architecture shown in FIG. 2, the configuration file 12 with version number 1 in the form of firmware and the configuration file 22 with version number 2 in the form of firmware are stored in different storage devices, and back up each other. If a fault occurs in a storage device, the FPGA architecture can still accomplish configuration, and system security is improved. For example, if a fault occurs in the first storage device 1, the input end 4 can provide a selection signal to select the second storage device 2, and the FPGA module 5n correspondingly reads the configuration file 22 from the second storage device 2; if a fault occurs in the second storage device 2, the input end 4 can provide a selection signal to select the first storage device 1, and the FPGA module 5n correspondingly reads the configuration file 12 from the first storage device 1.

Similarly, the input end 4 may be implemented as a CS signal input end, in which case the selection signal provided by the input end 4 is a chip select signal. A relationship whereby the first storage device 1 and the second storage device 2 correspond to HIGH/LOW levels of the chip select signal is set in advance. For example: when the chip select signal is HIGH, the first storage device 1 is selected; when the chip select signal is LOW, the second storage device 2 is selected.

Similarly, the input end 4 may also be implemented as two CE signal input ends, with each CE signal input end being connected to a corresponding storage device. For example, a first CE signal input end is connected to the first storage device 1; a second CE signal input end is connected to the second storage device 2. When the first CE signal input end provides a HIGH level, the first storage device 1 is selected; when the second CE signal input end provides a HIGH level, the second storage device 2 is selected, wherein the first CE signal input end and the second CE signal input end cannot be HIGH at the same time.

In an embodiment, the bus 3 may be implemented as a serial bus such as an SPI bus or an I2C protocol bus. Moreover, the first storage device 1 and the second storage device 2 may be implemented as flash memory, preferably NOR flash memory or NAND flash memory.

As noted above, FIG. 3 is a structural diagram of an FPGA configuration circuit according to a third embodiment of the present invention.

As FIG. 3 shows, the configuration circuit 300 has:

- n (n being a natural number of at least 2) FPGA modules 51, 52 . . . 5n which are individually connected to a bus 3;
- a first storage device 1, storing a configuration file 13 in the form of loadware, a version number of the configuration file being 1;
- a second storage device 2, storing a configuration file 23 in the form of loadware, a version number of the configuration file being 2;
- one of the n FPGA modules (e.g. FPGA module 5n) being connected to the first storage device 1 and the second storage device 2 separately, the FPGA module 5n being a master FPGA module, while the other FPGA modules are slave FPGA modules;
- an input end 4, connected to the first storage device 1 and the second storage device 2 separately, and providing a selection signal for selecting one of the first storage device 1 and the second storage device 2;
- wherein the FPGA module 5n connected to the first storage device 1 and the second storage device 2 reads a configuration file stored in a storage device selected on the basis of the selection signal, and sends the configuration file which has been read to the FPGA modules other than the FPGA module 5n via the bus 3.

When the selection signal provided by the input end 4 selects the first storage device 1, the FPGA module 5n connected to the first storage device 1 and the second storage device 2 reads the configuration file 13 with version number 1 in the form of loadware stored in the first storage device 1, and starts itself on the basis of the configuration file 13. Once the FPGA module 5n has successfully started, it sends the configuration file 13 with version number 1 in the form of loadware which has been read to the FPGA modules other than the FPGA module 5n via the bus 3. Having received the configuration file 13 with version number 1 in the form of loadware, the FPGA modules other than the FPGA module 5n are individually started on the basis of the configuration file 13.

When the selection signal provided by the input end 4 selects the second storage device 2, the FPGA module 5n connected to the first storage device 1 and the second storage device 2 reads the configuration file 23 with version number 2 in the form of loadware stored in the second storage device 2, and starts itself on the basis of the configuration file 23. Once the FPGA module 5n has successfully started, it sends the configuration file 23 with version number 2 in the form of loadware which has been read to the FPGA modules other than the FPGA module 5n via the bus 3. Having received the configuration file 23 with version number 2 in the form of loadware, the FPGA modules other than the FPGA module 5n are individually started on the basis of the configuration file 23.

In the FPGA architecture shown in FIG. 3, the master FPGA module can read configuration files which are both in the form of loadware but which are different versions according to the selection signal provided by the input end, thus the manner in which the FPGA architecture is configured is more flexible.

Furthermore, in the FPGA architecture shown in FIG. 3, the configuration file 13 with version number 1 in the form of loadware and the configuration file 23 with version number 2 in the form of loadware are stored in different storage devices, and back up each other. If a fault occurs in a storage device, the FPGA architecture can still accomplish configuration, and system security is improved. For example, if a fault occurs in the first storage device 1, the input end 4 can provide a selection signal to select the second storage device 2, and the FPGA module 5n correspondingly reads the configuration file 23 from the second storage device 2; if a fault occurs in the second storage device 2, the input end 4 can provide a selection signal to select the first storage device 1, and the FPGA module 5n correspondingly reads the configuration file 13 from the first storage device 1.

Similarly, the input end 4 may be implemented as a CS signal input end, in which case the selection signal provided by the input end is a chip select signal. A relationship whereby the first storage device 1 and the second storage device 2 correspond to HIGH/LOW levels of the chip select signal is set in advance. For example, when the chip select signal is HIGH, the first storage device 1 is selected; when the chip select signal is LOW, the second storage device 2 is selected.

Similarly, the input end 4 may also be implemented as two CE signal input ends, with each CE signal input end being connected to a corresponding storage device. For example, a first CE signal input end is connected to the first storage device 1; a second CE signal input end is connected to the second storage device 2. When the first CE signal input end provides a HIGH level, the first storage device 1 is selected; when the second CE signal input end provides a HIGH level, the second storage device 2 is selected, wherein the first CE signal input end and the second CE signal input end cannot be HIGH at the same time.

In an embodiment, the bus may be implemented as a serial bus such as an SPI bus or an I2C protocol bus. Moreover, the first storage device and the second storage device may be implemented as flash memory, preferably NOR flash memory or NAND flash memory.

In FIGS. 1, 2 and 3, the number of storage devices is two. In fact, the number of storage devices may be further increased. The embodiments of the present invention impose no restrictions in this respect.

As noted above, FIG. 4 is a structural diagram of an FPGA configuration circuit according to a fourth embodiment of the present invention. As FIG. 4 shows, the number of storage devices is 3.

As FIG. 4 shows, the configuration circuit 400 has:

- n (n being a natural number of at least 2) FPGA modules 51, 52 . . . 5n which are individually connected to a bus 3;
- a first storage device 1, storing a configuration file 14 in the form of firmware;
- a second storage device 2, storing a configuration file 24 in the form of loadware, a version number of the configuration file 24 being 1;
- a third storage device 6, storing a configuration file 34 in the form of loadware, a version number of the configuration file 34 being 2;
- one of the n FPGA modules (e.g. FPGA module 5n) being connected to the first storage device 1, the second storage device 2 and the third storage device 6 separately, the FPGA module 5n being a master FPGA module, while the other FPGA modules are slave FPGA modules;
- an input end 4, connected to the first storage device 1, the second storage device 2 and the third storage device 6 separately, for providing a selection signal for selecting one of the first storage device 1, the second storage device 2 and the third storage device 6;

wherein the FPGA module 5n connected to the first storage device 1, the second storage device 2 and the third storage device 6 reads a configuration file stored in a storage device selected on the basis of the selection signal, and sends the configuration file which has been read to the FPGA modules other than the FPGA module 5n via the bus 3.

When the selection signal provided by the input end 4 selects the first storage device 1, the FPGA module 5n connected to the first storage device 1, the second storage device 2 and the third storage device 6 reads the configuration file 14 in the form of firmware stored in the first storage device 1, and starts itself on the basis of the configuration file 14 in the form of firmware. Once the FPGA module 5n has successfully started, it sends the configuration file 14 in the form of firmware which has been read to the FPGA modules other than the FPGA module 5n via the bus 3. Having received the configuration file 14 in the form of firmware, the FPGA modules other than the FPGA module 5n are individually started on the basis of the configuration file 14 in the form of firmware.

When the selection signal provided by the input end 4 selects the second storage device 2, the FPGA module 5n connected to the first storage device 1, the second storage device 2 and the third storage device 6 reads the configuration file 24 with version number 1 in the form of loadware stored in the second storage device 2, and starts itself on the basis of the configuration file 24. Once the FPGA module 5n has successfully started, it sends the configuration file 24 with version number 1 in the form of loadware which has been read to the FPGA modules other than the FPGA module 5n via the bus 3. Having received the configuration file 24, the FPGA modules other than the FPGA module 5n are individually started on the basis of the configuration file 24.

When the selection signal provided by the input end 4 selects the third storage device 6, the FPGA module 5n connected to the first storage device 1, the second storage device 2 and the third storage device 6 reads the configuration file 34 with version number 2 in the form of loadware stored in the third storage device 6, and starts itself on the basis of the configuration file 34. Once the FPGA module 5n has successfully started, it sends the configuration file 34 with version number 2 in the form of loadware which has been read to the FPGA modules other than the FPGA module 5n via the bus 3. Having received the configuration file 34, the FPGA modules other than the FPGA module 5n are individually started on the basis of the configuration file 34.

In the FPGA architecture shown in FIG. 4, the master FPGA module 5n can read a configuration file in the form of firmware or configuration files of different versions in the form of loadware according to the selection signal provided by the input end 4, thus the manner in which the FPGA architecture is configured is more flexible.

Furthermore, in the FPGA architecture shown in FIG. 4, the configuration file 14 in the form of firmware, the configuration file 24 with version number 1 in the form of loadware and the configuration file 34 with version number 2 in the form of loadware are stored in different storage devices, and back up each other. If a fault occurs in a storage device, the FPGA architecture can still accomplish configuration, and system security is improved. For example, if a fault occurs in the first storage device 1, the input end 4 can provide a selection signal to select the second storage device 2 or the third storage device 6, and the FPGA module 5n can read a configuration file from the second storage device 2 or the third storage device 6; if a fault occurs in the second storage device 2, the input end 4 can provide a selection signal to select the first storage device 1 or the third storage device 6, and the FPGA module 5n can read a configuration file from the first storage device 1 or the third storage device 6.

The input end 4 may be implemented as two CS signal input ends, with each chip select CS signal input end being used to provide a chip select signal. A relationship whereby the storage devices correspond to binary codes formed by two chip select signals is set in advance. For example, when the binary code formed by the two chip select signals is 10, the first storage device 1 is selected; when the binary code formed by the two chip select signals is 11, the second storage device 2 is selected; when the binary code formed by the two chip select signals is 01, the third storage device 6 is selected.

The input end 4 may also be implemented as three CE signal input ends, with each CE signal input end being connected to a corresponding storage device. For example, a first CE signal input end is connected to the first storage device 1; a second CE signal input end is connected to the second storage device 2; a third CE signal input end is connected to the third storage device 6. When the first CE signal input end provides a HIGH level, the first storage device 1 is selected; when the second CE signal input end provides a HIGH level, the second storage device 2 is selected; when the third CE signal input end provides a HIGH level, the third storage device 6 is selected; wherein only one of the first CE signal input end, the second CE signal input end and the third CE signal input end can be HIGH at a particular moment.

In an embodiment, the bus 3 may be implemented as a serial bus such as an SPI bus or an I2C protocol bus. Moreover, the first storage device 1, the second storage device 2 and the third storage device 6 may each be implemented as flash memory, preferably NOR flash memory or NAND flash memory.

In FIG. 4, an FPGA configuration circuit 400 has been described in detail by taking the number of storage devices to be 3 as an example. Those skilled in the art will realize that the number of storage devices storing configuration files could be further increased; the present invention imposes no restrictions in this respect.

There is no external clock signal input in the FPGA configuration circuits proposed in the embodiments of the present invention, and the FPGA can be configured flexibly in diverse ways, which is especially suitable for radio-frequency units of magnetic resonance systems which have a strong demand for resistance to external interference.

In summary, in the embodiments of the present invention, there are at least two FPGA modules, each FPGA module being connected individually to a bus, at least two storage devices, each storage device storing a configuration file, one of the at least two FPGA modules being connected to the at least two storage devices separately, and an input end, connected separately to the at least two storage devices. A selection signal is provided for selecting one of the at least two storage devices. The FPGA module connected to the at least two storage devices reads a configuration file stored in a storage device selected on the basis of the selection signal, and sends via the bus, the configuration file that has been read to the FPGA module other than the FPGA module connected to the at least two storage devices. The master FPGA module can read a corresponding configuration file according to the selection signal provided by the input end, thus the manner in which the FPGA architecture is configured is more flexible.

Moreover, configuration files are stored in different storage devices, and back up each other. If a fault occurs in a storage device, the FPGA architecture can still obtain a configuration file from a storage device acting as backup and accomplish configuration, thereby improving system security.

Although modifications and changes may be suggested by those skilled in the art, it is the intention of the inventors to embody within the patent warranted hereon all changes and modifications as reasonably and properly come within the scope of their contribution to the art.

We claim as our invention:

1. A field-programmable gate array configuration circuit, comprising:
   a plurality of field-programmable gate array (FPGA) modules;
   a bus to which each FPGA module is individually connected so that one of said FPGA modules serves as a master FPGA module and all other FPGA modules in said plurality are slave FPGA modules;
   a first storage device with a loadware configuration file stored therein, and a second storage device with a firmware configuration file stored therein, with only said master FPGA module being connected to said first and second storage devices, with said master FPGA module being connected to each of the first and second storage devices via a respective individual connection;
   a signal input connected individually to each of the first and second storage devices, and providing a selection signal that selects one of the first and second storage devices, that are connected to said master FPGA module;
   wherein the master FPGA module connected to the first and second storage devices is configured to read the respective configuration file stored in the storage device that was selected by the selection signal, and is also configured to send, via the bus, the configuration file which has been read by said master FPGA module to all other FPGA modules in said plurality of FPGA modules.

2. The circuit as claimed in claim 1, a third storage device, and wherein said input signal selects one of said first, second or third storage devices and wherein:
   the configuration file in the second storage device is stored in a form of a first version of firmware, and the configuration file in the third storage device is stored in a form of a second version of firmware.

3. The circuit as claimed in claim 1, wherein the bus is a serial peripheral interface (SPI) bus or an I2C protocol bus.

4. The circuit as claimed in claim 1, wherein each of the first and second storage devices is a memory selected from the group consisting of a NOR flash memory and a NAND flash memory.

5. The circuit as claimed in claim 1, wherein the signal input is a chip select signal input or an enable signal input.

* * * * *